United States Patent
Banavara et al.

(10) Patent No.: US 12,295,393 B2
(45) Date of Patent: May 13, 2025

(54) FLAVORED ARTICLES HAVING A REDUCED PH

(71) Applicant: Firmenich SA, Meyrin (CH)

(72) Inventors: Dattatreya Banavara, Plainsboro, NJ (US); Ronald Skiff, Plainsboro, NJ (US); Priti Jha, Plainsboro, NJ (US)

(73) Assignee: Firmenich SA, Satigny (CH)

( * ) Notice: Subject to any disclaimer, the term of this patent is extended or adjusted under 35 U.S.C. 154(b) by 9 days.

(21) Appl. No.: 16/954,424

(22) PCT Filed: Mar. 21, 2019

(86) PCT No.: PCT/EP2019/057086
§ 371 (c)(1),
(2) Date: Jun. 16, 2020

(87) PCT Pub. No.: WO2019/180140
PCT Pub. Date: Sep. 26, 2019

(65) Prior Publication Data
US 2021/0084949 A1   Mar. 25, 2021

Related U.S. Application Data

(60) Provisional application No. 62/646,651, filed on Mar. 22, 2018.

(30) Foreign Application Priority Data

Apr. 10, 2018   (EP) .................................... 18166487

(51) Int. Cl.
*A23L 27/20*   (2016.01)
*A23L 27/00*   (2016.01)

(52) U.S. Cl.
CPC ............. *A23L 27/203* (2016.08); *A23L 27/88* (2016.08)

(58) Field of Classification Search
CPC .......... A23L 27/203; A23L 27/88; A23L 2/56; A23L 27/86; A23V 2002/00; A23F 5/02; A23F 5/24

See application file for complete search history.

(56) References Cited

U.S. PATENT DOCUMENTS

| | | | |
|---|---|---|---|
| 7,651,717 B2 | 1/2010 | Shioya et al. | |
| 8,197,875 B2 * | 6/2012 | Chien ................. | A23L 27/2026 426/548 |
| 2003/0003212 A1 | 1/2003 | Chien et al. | |
| 2006/0286202 A1 | 12/2006 | Boghani et al. | |
| 2008/0226795 A1 | 9/2008 | May et al. | |
| 2011/0008516 A1 | 1/2011 | Matsubayashi et al. | |
| 2017/0119032 A1 * | 5/2017 | Patron .................. | A23L 27/204 |

FOREIGN PATENT DOCUMENTS

| | | |
|---|---|---|
| CN | 106389504 A | 2/2017 |
| JP | 2004528050 A * | 9/2004 |
| WO | 2019/121551 A1 | 6/2019 |

OTHER PUBLICATIONS

International Search Report and Written Opinion for International Application No. PCT/EP2019/057086 dated Dec. 16, 2019, 13 pages.
Li et al. "Principles and Safe Use of Food Additives", National University of Defense Technology Press, p. 151 (2011).

* cited by examiner

*Primary Examiner* — Snigdha Maewall
(74) *Attorney, Agent, or Firm* — Robert S. Dailey

(57) ABSTRACT

The various aspects presented herein relate to the use of cyclohexanecarboxylic acids in flavored articles to improve the taste profile of the flavored article.

4 Claims, 3 Drawing Sheets

FLAVORED ARTICLES HAVING A REDUCED PH

CROSS-REFERENCE TO RELATED APPLICATIONS

The present application is the United States national-stage application of PCT Application No. PCT/EP2019/057086, filed Mar. 21, 2019, which claims priority to U.S. Provisional Application No. 62/646,651, filed on Mar. 22, 2018, and European Patent Application No. 18166487.1, filed on Apr. 10, 2018, the entire contents of which are hereby incorporated by reference in their entirety.

FIELD OF THE INVENTION

The various aspects presented herein relate to the use of cyclohexanecarboxylic acids in flavored articles to improve the taste profile of the flavored article.

BACKGROUND

Flavor modifiers are substances added to supplement, enhance, or modify the original flavor of a flavored article. Flavor is defined as the combined perception of taste, smell or aroma and chemical feeling factors. The perception of flavor is a result of the chemical stimulation of receptors in both the oral and nasal cavities. The basic tastes are sweet, sour, salty and bitter. Umami, described as another basic taste, enhances the taste effect of other ingredients and components of the flavor profile. These basic tastes, including Umami and certain trigeminal effects are perceived in the buccal cavity. Aroma may be the smell emanating from food before it is consumed or the flavor perceived while chewing and swallowing a product.

Flavor and/or aroma modifiers may be added to foods (including beverages), personal or household care products, pharmaceutical preparations, or other compositions to increase acceptance of products by enhancing desirable flavors and/or aromas or by masking or eliminating undesirable attributes. Flavor modifiers may be used to alter the taste and/or aroma of ingestible foods, nutraceuticals and pharmaceuticals, as well as oral and personal care products (e.g., mouthwash, toothpaste, cosmetics, perfumes and the like), or products that may be found in and around homes, businesses, and the like.

It has long been a goal to improve the quality of food products and to provide new and different flavor and aroma sensations to such products. Commercial production of foods expected to have a relatively long shelf-life often requires the use of processing conditions, storage conditions and/or addition of ingredients that may produce undesirable off-tastes in the food compositions. Typical solutions to taste problems are ineffective often due to the high cost of ingredients and manufacturing. The use of flavor modifiers could eliminate or substantially reduce the undesirable off-tastes in food compositions as well as improve the overall taste perception of the food and/or provide new and novel taste experiences.

By way of illustration, for food safety reasons, many flavored articles are required to have a reduced pH (approximately pH 2.6 to 4.6). This pH is achieved by adding food acids (inorganic and organic acids) which impart a high sour and acidic taste. Current methods to mask the acidic and bitter taste include the addition of sugar (in the case of sweet flavored articles), or salt (in the case of savory articles), which may be undesirable.

Accordingly, it would be desirable to supply a flavor modifier that could provide flavor improvements and novelty to foods and preferably contribute these benefits in a healthy and cost effective manner.

SUMMARY

Figure 1:
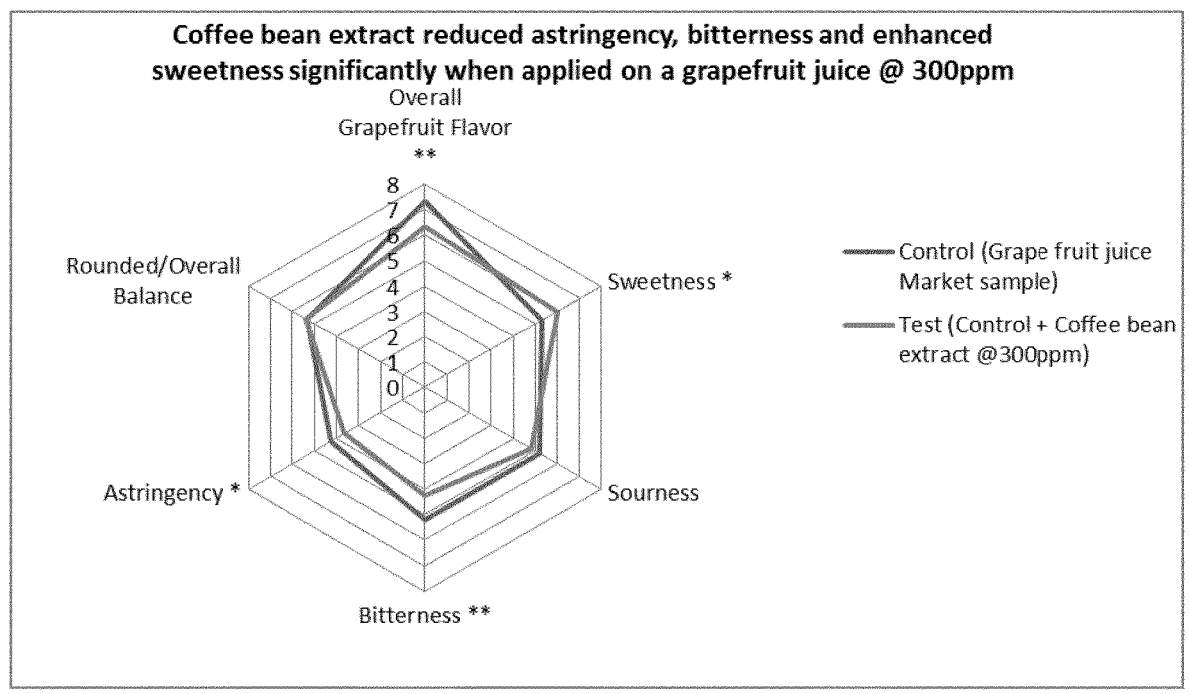
FIG. 1 shows the sensory profile of a base comprising grapefruit juice containing 300 ppm green coffee extract (containing 50% cyclohexanecarboxylic acids, by weight of the extract), and a corresponding control sample comprising grapefruit juice alone.

One aspect presented herein, provides a method, wherein the method reduces or masks the bitterness, or improves the taste profile of a flavored article, wherein the method comprises the step of adding an olfactory and/or gustatory effective amount of at least one cyclohexanecarboxylic acid to the flavored article.

One aspect presented herein, provides a method, wherein the method enhances the sweetness and/or improves the sweetness profile of a flavored article, wherein the method comprises the step of adding an olfactory and/or gustatory effective amount of at least one cyclohexanecarboxylic acid to the flavored article.

One aspect presented herein, provides a method, wherein the method enhances, or improves the sourness profile of a flavored article, wherein the method comprises the step of adding an olfactory and/or gustatory effective amount of at least one cyclohexanecarboxylic acid to the flavored article.

In one aspect, the enhancement or improvement of the sourness profile is a reduction in the sourness of the flavored article.

In one aspect, the reduction or masking of bitterness, or the improvement of the taste profile is a reduction in the off-taste of the flavored article.

In one aspect, the flavored article comprises a natural and/or artificial sweetener.

In one aspect, the enhancement of sweetness is an improvement of the sweetness profile of the flavored article.

In one aspect, the olfactory and/or gustatory effective amount of the at least one cyclohexanecarboxylic acid reduces the pH of the flavored article.

In one aspect, the at least one cyclohexanecarboxylic acid is obtained from a botanical extract selected from the group consisting of green coffee bean extract, honeysuckle flower extract, and eucommia bark extract.

In one aspect, the at least one cyclohexanecarboxylic acid is selected from the group consisting of 5-caffeoylquinic acid (5-CQA), 3-caffeoylquinic acid (3-CQA), 4-caffeoylquinic acid (4-CQA), 3,4-dicaffeoylquinic acid (3,4-diCQA), 3,5-dicaffeoylquinic acid (3,5-diCQA), 4,5-dicaffeoylquinic acid (4,5-diCQA), 3-feruloylquinic acid (3-FQA), 4-feruloylquinic acid (4-FQA), 5-feruloylquinic acid (5-FQA), 3-p-coumaroylquinic acid (3-p-CoQA), 4-p- coumaroylquinic acid (4-p-CoQA), 5-p-coumaroylquinic acid (3-p-CoQA), 3,4-caffeoylferuloylquinic acid (3,4-CFQA), 3,4-feruloylcaffeoylquinic acid (3,4-FCQA), 3,5-caffeoylferuloylquinic acid (3,5-CFQA), 3,5-feruloylcaffeoylquinic acid (3,4-FCQA), 4,5-caffeoylferuloylquinic acid (4,5-CFQA), 4,5-feruloylcaffeoylquinic acid (4,5-FCQA), and combinations thereof.

In one aspect, the at least one cyclohexanecarboxylic acid is 5-caffeoylquinic acid.

In one aspect, the olfactory and/or gustatory effective amount of the at least one cyclohexanecarboxylic acid is from 50 to 1000 ppm in the flavored article.

DETAILED DESCRIPTION

In the following description, reference is made to specific embodiments which may be practiced, which is shown by way of illustration. These embodiments are described in detail to enable those skilled in the art to practice the invention described herein, and it is to be understood that other embodiments may be utilized and that logical changes may be made without departing from the scope of the aspects presented herein. The following description of example embodiments is, therefore, not to be taken in a limited sense, and the scope of the various aspects presented herein is defined by the appended claims.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

It has been surprisingly discovered that the addition of at least one cyclohexanecarboxylic acid to a flavored article can reduce or mask the bitterness, or improve the taste profile of a flavored article.

As used herein, the term "olfactory and/or gustatory effective amount" refers to the amount of the at least one cyclohexanecarboxylic acid, when present in a flavored article, that reduces or masks the bitterness, or improves the taste profile of the flavored article. Alternatively, as used herein, the term "olfactory and/or gustatory effective amount" refers to the amount of the at least one cyclohexanecarboxylic acid, when present in a flavored article, that enhances the sweetness of the flavored article. Alternatively, as used herein, the term "olfactory and/or gustatory effective amount" refers to the amount of the at least one cyclohexanecarboxylic acid, when present in a flavored article, enhances, or improves the sourness profile of the flavored article.

In some aspects, the at least one cyclohexanecarboxylic acid may comprise an extract obtained from a variety of botanicals such as fruits (for example, apples, apricots, blackberries, blueberries, cherries, citrus fruits, peaches, pears, plums and strawberries), plant leaves (for example, blueberry, mate, stevia or eucommia leaves), vegetables (for example, artichokes, Brussels sprouts, cabbages, carrots, eggplants, kales, peppers, potatoes and tomatoes) and other plants (for example, bamboos, coffee beans, honeysuckle flowers, sunflower seeds and yerba mate).

The botanical extract can be obtained commercially, or isolated or generated according to procedures known in the art, for example, as described by Farah et al., J. Nutr. December 2008, vol. 138 no. 12, 2309-2315, or Upadhyay et al., Crit. Rev. Food. Sci. Nutr., 2013, Vol. 53, 968-984, or Li et al., Medicinal Plant, 2014, Vol. 5, 4-7.

Accordingly, some aspects presented herein provide a method, wherein the method reduces or masks the bitterness, or improves the taste profile of a flavored article, wherein the method comprises the step of adding a botanical extract to the flavored article, wherein the botanical extract contains at least one cyclohexanecarboxylic acid, wherein the botanical extract is added in an amount sufficient to result in an olfactory and/or gustatory effective amount of at least one cyclohexanecarboxylic acid in the flavored article.

Alternatively, some aspects presented herein, provide a method, wherein the method reduces or masks the bitterness, or improves the taste profile of a flavored article, wherein the method comprises the step of adding an olfactory and/or gustatory effective amount of at least one cyclohexanecarboxylic acid to the flavored article.

In some aspects, the olfactory and/or gustatory effective amount of the at least one cyclohexanecarboxylic acid reduces the astringency of the flavored article.

In some aspects, the reduction or masking of bitterness, or the improvement of the taste profile is a reduction in the off-taste of the flavored article, wherein the flavored article comprises a natural and/or artificial sweetener.

In some aspects, the olfactory effective amount of at least one cyclohexanecarboxylic acid reduces the amount of sugar and/or artificial sweetener that may be required to reduce or mask the bitterness, or improve the taste profile of the flavored article.

In some aspects, the amount of sugar and/or artificial sweetener that may be required to reduce or mask the bitterness, or improve the taste profile of the flavored article is reduced by 1, or 2, or 3, or 4, or 5, or 6, or 7, or 8, or 9, or 10, or 11, or 12, or 13, or 14, or 15, or 16, or 17, or 18, or 19, or 20, or 21, or 22, or 23, or 24, or 25, or 26, or 27, or 28, or 29, or 30, or 31, or 32, or 33, or 34, or 35, or 36, or 37, or 38, or 39, or 40, or 41, or 42, or 43, or 44, or 45, or 46, or 47, or 48, or 49, or 50%, or more.

In some aspects, the olfactory effective amount of at least one cyclohexanecarboxylic acid reduces the amount of salt that may be required to reduce or mask the bitterness, or improve the taste profile of the flavored article.

In some aspects, the amount of salt that may be required to reduce or mask the bitterness, or improve the taste profile of the flavored article is reduced by 1, or 2, or 3, or 4, or 5, or 6, or 7, or 8, or 9, or 10, or 11, or 12, or 13, or 14, or 15, or 16, or 17, or 18, or 19, or 20, or 21, or 22, or 23, or 24, or 25, or 26, or 27, or 28, or 29, or 30, or 31, or 32, or 33, or 34, or 35, or 36, or 37, or 38, or 39, or 40, or 41, or 42, or 43, or 44, or 45, or 46, or 47, or 48, or 49, or 50%, or more.

Some aspects presented herein provide a method, wherein the method enhances the sweetness of a flavored article, wherein the method comprises the step of adding a botanical extract to the flavored article, wherein the botanical extract contains at least one cyclohexanecarboxylic acid, wherein the botanical extract is added in an amount sufficient to result in an olfactory and/or gustatory effective amount of at least one cyclohexanecarboxylic acid in the flavored article.

Alternatively, some aspects presented herein provide a method, wherein the method enhances the sweetness of a flavored article, wherein the method comprises the step of adding an olfactory and/or gustatory effective amount of at least one cyclohexanecarboxylic acid to the flavored article.

In some aspects, the enhancement of the sweetness of the flavored article is an improvement of the sweetness profile of the flavored article. In some aspects, the sweetness profile is determined via a sensory panel, wherein the sweetness profile is defined as the ratio of the sweetness intensity to lingering sweetness.

By way of illustration, some sweeteners, such as, for example, stevia have undesirable off-tastes, compared to sucrose. In some aspects, some food acids may enhance the undesirable off-tastes. Accordingly, the olfactory and/or gustatory effective amount of the at least one cyclohexanecarboxylic acid reduces or masks the undesirable off-tastes of sweeteners, such as, for example, stevia.

Some aspects presented herein provide a method, wherein the method enhances, or improves the sourness profile of a flavored article, wherein the method comprises the step of adding a botanical extract to the flavored article, wherein the botanical extract contains at least one cyclohexanecarboxylic acid, wherein the botanical extract is added in an amount sufficient to result in an olfactory and/or gustatory effective amount of at least one cyclohexanecarboxylic acid in the flavored article.

Alternatively, some aspects presented herein provide a method, wherein the method enhances, or improves the sourness profile of a flavored article, wherein the method comprises the step of adding an olfactory and/or gustatory effective amount of at least one cyclohexanecarboxylic acid to the flavored article.

In some aspects, the enhancement or improvement of the sourness profile is a reduction in the sourness of the flavored article.

In some aspects, the olfactory and/or gustatory effective amount of the at least one cyclohexanecarboxylic acid reduces the astringency of the flavored article.

In some aspects, the botanical extract is selected from the group consisting of green coffee bean extract, honeysuckle flower extract, and eucommia bark extract.

In some aspects, the at least one cyclohexanecarboxylic acid is selected from the group consisting of 5-caffeoylquinic acid (5-CQA), 3-caffeoylquinic acid (3-CQA), 4-caffeoylquinic acid (4-CQA), 3,4-dicaffeoylquinic acid (3,4-diCQA), 3,5-dicaffeoylquinic acid (3,5-diCQA), 4,5-dicaffeoylquinic acid (4,5-diCQA), 3-feruloylquinic acid (3-FQA), 4-feruloylquinic acid (4-FQA), 5-feruloylquinic acid (5-FQA), 3-p-coumaroylquinic acid (3-p-CoQA), 4-p-coumaroylquinic acid (4-p-CoQA), 5-p-coumaroylquinic acid (3-p-CoQA), 3,4-caffeoylferuloylquinic acid (3,4-CFQA), 3,4-feruloylcaffeoylquinic acid (3,4-FCQA), 3,5-caffeoylferuloylquinic acid (3,5-CFQA), 3,5-feruloylcaffeoylquinic acid (3,4-FCQA), 4,5-caffeoylferuloylquinic acid (4,5-CFQA), 4,5-feruloylcaffeoylquinic acid (4,5-FCQA), and combinations thereof may also be tested in model systems. In some aspects, the at least one cyclohexanecarboxylic acid may be in the form of a enantiomer, or a diastereoisomer, or a mixture thereof.

In some aspects, the olfactory and/or gustatory effective amount of the cyclohexanecarboxylic acid is from 50 to 1000 ppm in the flavored article. In some aspects, the olfactory and/or gustatory effective amount of the cyclohexanecarboxylic acid is from 50 to 900 ppm in the flavored article. In some aspects, the olfactory and/or gustatory effective amount of the cyclohexanecarboxylic acid is from 50 to 800 ppm in the flavored article. In some aspects, the olfactory and/or gustatory effective amount of the cyclohexanecarboxylic acid is from 50 to 700 ppm in the flavored article. In some aspects, the olfactory and/or gustatory effective amount of the cyclohexanecarboxylic acid is from 50 to 600 ppm in the flavored article. In some aspects, the olfactory and/or gustatory effective amount of the cyclohexanecarboxylic acid is from 50 to 500 ppm in the flavored article. In some aspects, the olfactory and/or gustatory effective amount of the cyclohexanecarboxylic acid is from 50 to 400 ppm in the flavored article. In some aspects, the olfactory and/or gustatory effective amount of the cyclohexanecarboxylic acid is from 50 to 300 ppm in the flavored article. In some aspects, the olfactory and/or gustatory effective amount of the cyclohexanecarboxylic acid is from 50 to 200 ppm in the flavored article. In some aspects, the olfactory and/or gustatory effective amount of the cyclohexanecarboxylic acid is from 50 to 100 ppm in the flavored article. In some aspects, the olfactory and/or gustatory effective amount of the cyclohexanecarboxylic acid is from 50 to 90 ppm in the flavored article. In some aspects, the olfactory and/or gustatory effective amount of the cyclohexanecarboxylic acid is from 50 to 80 ppm in the flavored article. In some aspects, the olfactory and/or gustatory effective amount of the cyclohexanecarboxylic acid is from 50 to 70 ppm in the flavored article. In some aspects, the olfactory and/or gustatory effective amount of the cyclohexanecarboxylic acid is from 50 to 60 ppm in the flavored article.

In some aspects, the olfactory and/or gustatory effective amount of the cyclohexanecarboxylic acid is from 60 to 1000 ppm in the flavored article. In some aspects, the olfactory and/or gustatory effective amount of the cyclohexanecarboxylic acid is from 70 to 1000 ppm in the flavored article. In some aspects, the olfactory and/or gustatory effective amount of the cyclohexanecarboxylic acid is from 80 to 1000 ppm in the flavored article. In some aspects, the olfactory and/or gustatory effective amount of the cyclohexanecarboxylic acid is from 90 to 1000 ppm in the flavored article. In some aspects, the olfactory and/or gustatory effective amount of the cyclohexanecarboxylic acid is from 100 to 1000 ppm in the flavored article. In some aspects, the olfactory and/or gustatory effective amount of the cyclohexanecarboxylic acid is from 200 to 1000 ppm in the flavored article. In some aspects, the olfactory and/or gustatory effective amount of the cyclohexanecarboxylic acid is from 300 to 1000 ppm in the flavored article. In some aspects, the olfactory and/or gustatory effective amount of the cyclohexanecarboxylic acid is from 400 to 1000 ppm in the flavored article. In some aspects, the olfactory and/or gustatory effective amount of the cyclohexanecarboxylic acid is from 500 to 1000 ppm in the flavored article. In some aspects, the olfactory and/or gustatory effective amount of the cyclohexanecarboxylic acid is from 600 to 1000 ppm in the flavored article. In some aspects, the olfactory and/or gustatory effective amount of the cyclohexanecarboxylic acid is from 700 to 1000 ppm in the flavored article. In some aspects, the olfactory and/or gustatory effective amount of the cyclohexanecarboxylic acid is from 800 to 1000 ppm in the flavored article. In some aspects, the olfactory and/or gustatory effective amount of the cyclohexanecarboxylic acid is from 900 to 1000 ppm in the flavored article.

In some aspects, the olfactory and/or gustatory effective amount of the cyclohexanecarboxylic acid is 50, or 60, or 70, or 80, or 90, or 100, or 200, or 300, or 400, or 500, or 600, or 700, or 800, or 900, or 1000 ppm in the flavored article.

In some aspects, the olfactory and/or gustatory effective amount of the at least one cyclohexanecarboxylic acid reduces the pH of the flavored article.

The pH of the flavored article may be reduced to a pH of less than 7. For example, the pH of the flavored article may be reduced to a pH of 6.5, or 6, or 5.5, or 5, or 4.5, or 4, or 3.5, or 3, or 2.5, or 2.

In some aspects, the pH of the flavored article may be reduced to a pH of 2.5.

In some aspects, the reduction of pH increases the shelf-life of the flavored article.

In some aspects, the olfactory and/or gustatory effective amount of the at least one cyclohexanecarboxylic acid imparts, improves, or enhances the mouthfeel of the flavored article.

The Cyclohexanecarboxylic Acid

In some aspects, the cyclohexanecarboxylic acid is a chlorogenic acid. As used herein, the term "chlorogenic acid" refers to phenolic acids found in plant materials. Chlorogenic acids may be classified by the identity, number, and position of the acyl residues on the quinic acid.

The cyclohexanecarboxylic acids of the present invention can be obtained commercially, synthesized according to procedures known in the art, for example, as described by Sefkow (Eur. J. Org. Chem. 2001, 1137-1141) or obtained from a variety of botanicals such as fruits (for example, apples, apricots, blackberries, blueberries, cherries, citrus fruits, peaches, pears, plums and strawberries), plant leaves (for example, blueberry. mate, stevia, or eucommia leaves), vegetables (for example, artichokes, Brussels sprouts, cabbages, carrots, eggplants, kales, peppers, potatoes and tomatoes) and other plants (for example, bamboos, coffee beans, honeysuckle flowers, sunflower seeds and yerba mate).

In some aspects, the cyclohexanecarboxylic acid is selected from the cyclohexanecarboxylic acids disclosed in International Patent Application Publication No. WO 2002/100192 A1.

In some aspects, the cyclohexanecarboxylic acid is selected from the cyclohexanecarboxylic acids disclosed in International Patent Application Publication No. WO 2016/209664 A1.

In some aspects, the cyclohexanecarboxylic acid is selected from the cyclohexanecarboxylic acids disclosed in U.S. Pat. No. 6,632,459 B2.

In some aspects, the at least one cyclohexanecarboxylic acid is selected from the group consisting of 5-caffeoylquinic acid (5-CQA), 3-caffeoylquinic acid (3-CQA), 4-caffeoylquinic acid (4-CQA), 3,4-dicaffeoylquinic acid (3,4-diCQA), 3,5-dicaffeoylquinic acid (3,5-diCQA), 4,5-dicaffeoylquinic acid (4,5-diCQA), 3-feruloylquinic acid (3-FQA), 4-feruloylquinic acid (4-FQA), 5-feruloylquinic acid (5-FQA), 3-p-coumaroylquinic acid (3-p-CoQA), 4-p-coumaroylquinic acid (4-p-CoQA), 5-p-coumaroylquinic acid (3-p-CoQA), 3,4-caffeoylferuloylquinic acid (3,4-CFQA), 3,4-feruloylcaffeoylquinic acid (3,4-FCQA), 3,5-caffeoylferuloylquinic acid (3,5-CFQA), 3,5-feruloyl-caffeoylquinic acid (3,4-FCQA), 4,5-caffeoylferuloylquinic acid (4,5-CFQA), 4,5-feruloylcaffeoylquinic acid (4,5-FCQA), and combinations thereof. In some aspects, the at least one cyclohexanecarboxylic acid may be in the form of a enantiomer, or a diastereoisomer, or a mixture thereof.

In some aspects, the at least one cyclohexanecarboxylic acid is 5-caffeoylquinic acid.

In some aspects, the at least one cyclohexanecarboxylic acid is purified from green coffee. Examples of methods to purify cyclohexanecarboxylic acid from green coffee, and compositions comprising cyclohexanecarboxylic acid extracted from green coffee are disclosed in Del Rio et al., Nutrients 2(8): 820-833 (2010).

Flavored Articles

The at least one cyclohexanecarboxylic acid may be added directly to the flavored article. Alternatively, the at least one cyclohexanecarboxylic acid may be pre-mixed with certain ingredients of the flavored article. For example, the at least one cyclohexanecarboxylic acid may be admixed with ingredients responsible for imparting a sour taste to the flavored article that may be thereafter added to the remaining ingredients of the flavored article.

A flavored article includes, for example, a food product (e.g., a beverage), a sweetener such as a natural sweetener or an artificial sweetener, a pharmaceutical composition, a dietary supplement, a nutraceutical, a dental hygienic composition and a cosmetic product. The flavored article may further contain at least one flavoring.

In some aspects, the at least one flavoring may further modify the taste profile or taste attributes of the flavored article.

In some aspects, the flavored article is a food product including, for example, but not limited to, fruits, vegetables, juices, meat products such as ham, bacon and sausage, egg products, fruit concentrates, gelatins and gelatin-like products such as jams, jellies, preserves and the like, milk products such as ice cream, sour cream and sherbet, icings, syrups including molasses, corn, wheat, rye, soybean, oat, rice and barley products, nut meats and nut products, cakes, cookies, confectioneries such as candies, gums, fruit flavored drops, and chocolates, chewing gums, mints, creams, pies and breads.

In some aspects, the food product is a beverage including, for example, but not limited to, juices, juice containing beverages, coffee, tea, carbonated soft drinks, such as COKE and PEPSI, non-carbonated soft drinks and other fruit drinks, sports drinks such as GATORADE and alcoholic beverages such as beers, wines and liquors.

A flavored article may also include prepared packaged products, such as granulated flavor mixes, which upon reconstitution with water provide non-carbonated drinks, instant pudding mixes, instant coffee and tea, coffee whiteners, malted milk mixes, pet foods, livestock feed, tobacco, and materials for baking applications, such as powdered baking mixes for the preparation of breads, cookies, cakes, pancakes, donuts and the like.

A flavored article may also include diet or low-calorie food and beverages containing little or no sucrose. Flavored articles may also include condiments such as herbs, spices and seasonings, flavor enhancers (e.g., monosodium glutamate), dietetic sweeteners and liquid sweeteners.

In some aspects, the flavored article is a pharmaceutical composition, a dietary supplement, a nutraceutical, a dental hygienic composition or a cosmetic product.

Dental hygiene compositions are known in the art and include, for example, but not limited to, a toothpaste, a mouthwash, a plaque rinse, a dental floss, a dental pain reliever (such as ANBESOL) and the like. In some aspects, the dental hygiene composition includes one natural sweetener. In some aspects, the dental hygiene composition includes more than one natural sweetener. In some aspects, the dental hygiene composition includes sucrose and corn syrup, or sucrose and aspartame.

In some aspects, a cosmetic product includes, for example, but not limited to, a face cream, a lipstick, a lip gloss and the like. Other suitable cosmetic products of use in this disclosure include a lip balm, such as CHAPSTICK or BURT'S BEESWAX Lip Balm.

The present invention is best illustrated but is not limited to the following examples.

Example 1: Sensory Evaluation of Cyclohexanecarboxylic Acid as a Sourness Masker in a Model System Comprising a Solution of 95% Pure Steviol Glycoside A Model System Comprising a Solution of 95% Pure Steviol Glyscoside: A solution of 400 ppm 95% pure steviol glycoside was prepared. Chlorogenic acid (CGA) was added to aliquots of the solution and the pH recorded. The results are shown in the table below.

| pH impact of Chlorogenic acid on SG 95 | | |
|---|---|---|
| Ingredient | Dosage (ppm) | pH |
| SG 95 | 400 | 7.011 |
| SG 95 | 400 | 6.21 |
| CGA | 50 | |
| SG 95 | 400 | 5.724 |
| CGA | 100 | |
| SG 95 | 400 | 4.048 |
| CGA | 200 | |
| SG 95 | 400 | 3.919 |
| CGA | 300 | |
| SG 95 | 400 | 3.89 |
| CGA | 400 | |

The aliquots were also tasted to assess the effect of chlorogenic acid on the sourness of the solution of 95% pure steviol glycoside, at the various pH levels. The data reported in the table demonstrate that chlorogenic acid was capable of reducing the pH of the solution of 95% pure steviol glycoside in a dose dependent manner. However, no increase in sourness of the solution of 95% pure steviol glycoside was reported.

In a separate study, the ability of chlorogenic acid to reduce the pH of a solution of 95% pure steviol glycoside and 500 ppm citric acid was tested. The results are reported in the table below.

| pH impact of Chlorogenic acid on solution of SG 95 & Citric acid | | |
|---|---|---|
| Ingredient | Dosage (ppm) | Ph |
| SG 95 | 400 | 3.338 |
| Citric acid | 500 | |
| SG 95 | 400 | 3.324 |
| Citric acid | 500 | |
| CGA | 50 | |
| SG 95 | 400 | 3.325 |
| Citric acid | 500 | |
| CGA | 100 | |
| SG 95 | 400 | 3.309 |
| Citric acid | 500 | |
| CGA | 200 | |
| SG 95 | 400 | 3.301 |
| Citric acid | 500 | |
| CGA | 300 | |
| SG 95 | 400 | 3.283 |
| Citric acid | 500 | |
| CGA | 400 | |

These data show that chlorogenic acid was not capable of reducing the pH of the solution below that caused by the addition of 500 ppm citric acid.

The sensory profiles of the samples listed in the table above were also evaluated, and the results are shown in the table below.

| | Sweetness Intensity | Lingering sweetness | Offtaste | Sourness | Comments |
|---|---|---|---|---|---|
| SG 95 @400 ppm + CA @500 ppm + | 5 | 2.63 | 1.75 | 4.00 | bitterness, lingering sweet |
| SG 95 @400 ppm + CA @500 ppm + CGA. @50 ppm | 4.88 | 1.88 | 1.25 | 4.00 | Slightly Lingering sweet |
| SG 95 @400 ppm + CA @500 ppm + CGA. @100 ppm | 4.5 | 1.5 | 1.13 | 3.00 | Clean, Tastes syrupy, candy like, |
| SG 95 @400 ppm + CA @500 ppm + CGA. @200 ppm | 4.13 | 1.38 | 1.38 | 3.00 | Slight Astringent, syrupy mouthfeel, candy like |

Chlorogenic acid was found to reduce the sourness of the citric acid and improved the mouthfeel and syrupy/candy character of the samples (reminiscent of a sugar-like taste). In addition, referring to the ratio of the sweetness intensity to lingering sweetness (an indication of the sweetness profile of the sample, wherein a higher ratio is indicative of a better sweetness profile), these data suggest that the addition of 100 to 200 ppm chlorogenic acid improved the sweetness profile of the solution of 95% pure steviol glycoside.

Example 2: Sensory Evaluation of Cyclohexanecarboxylic Acid as a Sourness Masker in a Model System Comprising Coconut Water A Model System Comprising Coconut Water: A model system comprising coconut water, and control samples were generated according to the recipe set forth in the table below.

| Samples | Flavors | Amount |
|---|---|---|
| Control | Sugar | 4.75 |
| | Coconut juice Concentrate 60 Brix | 0.25 |
| | Apple juice Concentrate 70 Brix | 0.33 |
| | Tri Sodium Citrate | 0.01 |
| | Salt | 0.015 |
| | Potassium Chloride | 0.14 |
| | Pectin | 0.05 |
| | Water | Qs to 100 |
| Sample 1 | Control + Chlorogenic acid @0.05% | |
| Sample 2 | Control + Citric acid @0.065% | |

Chlorogenic acid (CGA) was added to aliquots of the solution and the pH recorded. The aliquots were also tasted to assess the effect of Chlorogenic acid on the sensory properties. The results are shown in the table below.

| CGA (>95% Pure) | Citric Acid | pH | Evaluation |
|---|---|---|---|
| 0 | | 5.71 | Sweet, round |
| 50 ppm | | 5.2 | clean, no significant off-taste |
| 500 ppm | | 3.68 | clean, slightly acidic, slightly astringent, a bit green, mildly sour |
| | 650 ppm | 3.68 | Sour, Acidic, reduced sweetness and lacks mouthfeel |

The sensory panel comprised 30 subjects. The sensory results are reported in the table below.

| Attribute | Control pH(5.71) | With CGA (pH 3.68) | With Citric Acid pH (3.68) | P-Value |
|---|---|---|---|---|
| Overall Flavor | 4.50 | 4.61 | 4.71 | 0.9057 |
| Sweetness | 4.32 | 4.42 | 4.31 | 0.9523 |
| Sourness | 1.51c | 2.33b | 4.36a | 0.0001 |
| Mouthfeel | 4.19ab | 4.61a | 3.84h | 0.0254 |
| Refreshing | 3.68 | 3.39 | 3.31 | 0.5327 |
| Balanced | 4.58a | 3.65b | 3.33b | 0.0140 |

These data suggest that chlorogenic acid significantly increased mouthfeel and decreased sourness, compared to a control sample having the same pH.

Example 3: Sensory Evaluation of a Green Coffee Extract Comprising Cyclohexanecarboxylic Acids as a Sourness Masker in a Model System Comprising Various Juices A Model System Comprising Various Juices: A model system comprising juices and green coffee extract, and control samples were generated according to the recipe set forth in the table below.

| Samples | Flavors | Amount |
|---|---|---|
| Grapefruit Juice—test | Base—Grapefruit Juice sample (Ocean Spray brand—total carbohydrate 28 g per serving, and total sugar 25 g per serving) | 300 ppm green coffee extract comprising 50% cyclohexanecarboxylic acids by weight of the extract |
| Grapefruit Juice—control | Base—Grapefruit Juice sample (Ocean Spray brand—total carbohydrate 28 g per serving, and total sugar 25 g per serving) | — |
| Cranberry Juice—test | Base—Cranberry Juice sample (no added sugar—total carbohydrate 28 g per serving, and total sugar 22 g per serving) | 300 ppm green coffee extract comprising 50% cyclohexanecarboxylic acids by weight of the extract |
| Cranberry Juice—control | Base—Cranberry Juice sample (no added sugar—total carbohydrate 28 g per serving, and total sugar 22 g per serving) | — |
| Tomato Juice—test | Base—Tomato Juice sample (Campbell) | 300 ppm green coffee extract comprising 50% cyclohexanecarboxylic acids by weight of the extract |
| Tomato Juice—control | Base—Tomato Juice sample (Campbell) | — |

Figure 2:
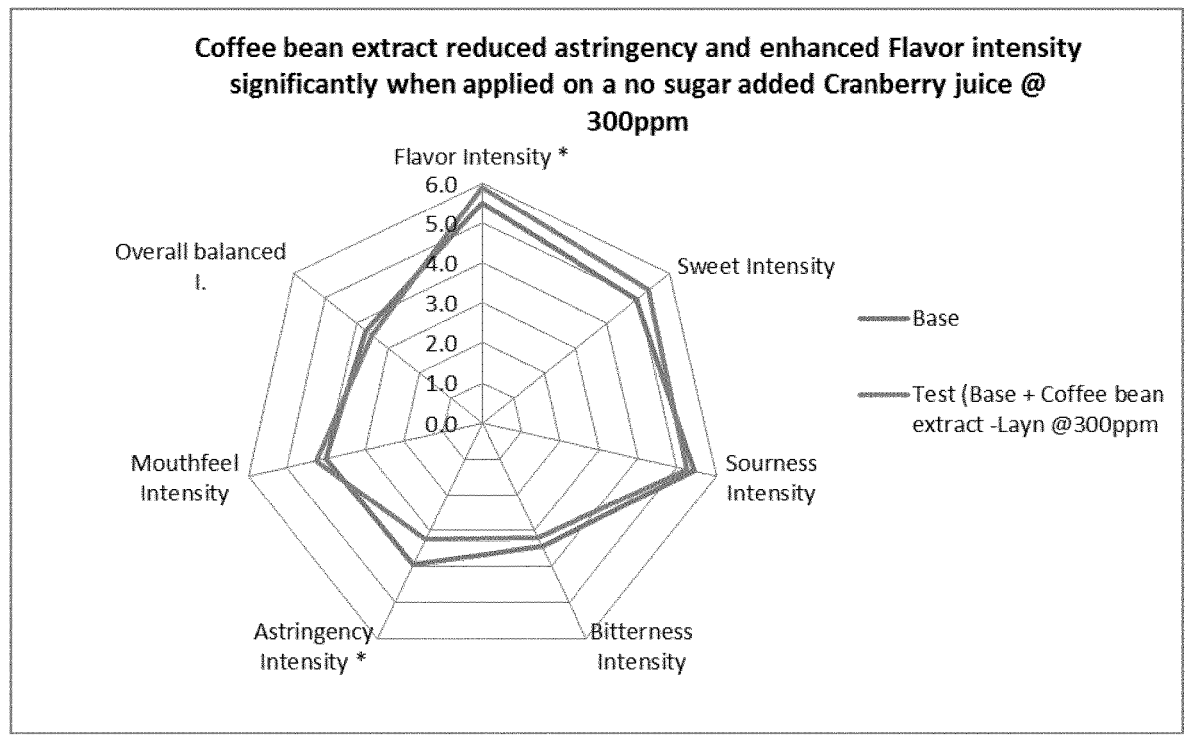
FIG. 2 shows the sensory profile of a base comprising cranberry juice containing 300 ppm green coffee extract (containing 50% cyclohexanecarboxylic acids, by weight of the extract), and a corresponding control sample comprising cranberry juice alone.
Figure 3:
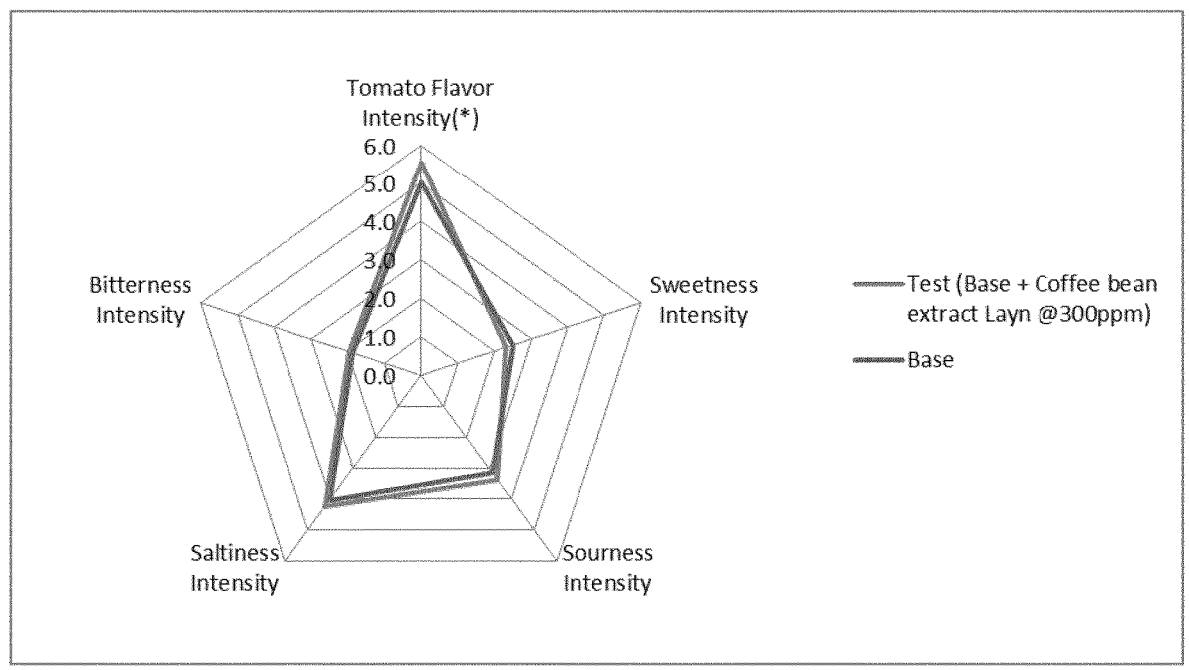
FIG. 3 shows the sensory profile of a base comprising tomato juice containing 300 ppm green coffee extract (containing 50% cyclohexanecarboxylic acids, by weight of the extract), and a corresponding control sample comprising tomato juice alone.

The aliquots were tasted to assess the effect of the green coffee extract on the sensory properties of the samples. The results are shown in the tables below and in FIGS. 1 to 3.

Grapefruit Juice:

| | Control | Test | P-Value |
|---|---|---|---|
| Overall Grapefruit Flavor | 7.31 (a) | 6.30 (b) | 0.0006 |
| Sweetness | 5.31 (b) | 5.98 (a) | 0.0126 |
| Sourness | 5.17 | 4.83 | 0.2792 |
| Bitterness | 5.20 (a) | 4.24 (b) | 0.0015 |
| Astringency | 4.26 (a) | 3.63 (b) | 0.0079 |
| Rounded/Overall Balance | 5.35 | 5.41 | 0.8750 |

Cranberry Juice:

| | Flavor Intensity | Sweet Intensity | Sourness Intensity | Bitterness Intensity | Astringency Intensity | Mouthfeel Intensity | Overall balanced I. |
|---|---|---|---|---|---|---|---|
| Control | 5.500 b | 4.938 a | 5.438 a | 3.438 a | 3.938 a | 4.000 a | 3.688 a |
| Test | 5.875 a | 5.313 a | 5.250 a | 3.188 a | 3.250 b | 4.250 a | 3.500 a |
| Pr > F | 0.080 | 0.336 | 0.685 | 0.632 | 0.045 | 0.516 | 0.757 |
| Significant | Yes | No | No | No | Yes | No | No |

Tomato Juice:

| | Tomato Flavor Intensity (*) | Sweetness Intensity | Sourness Intensity | Saltiness Intensity | Bitterness Intensity |
|---|---|---|---|---|---|
| Test | 5.545 a | 2.318 a | 3.364 a | 4.227 a | 1.955 a |
| Control | 5.1 b | 2.500 a | 3.136 a | 4.045 a | 1.864 a |
| Pr > F( | 0.1 | 0.341 | 0.518 | 0.610 | 0.796 |
| Significant | YES | No | No | No | No |

These data suggest that the green coffee extract comprising cyclohexanecarboxylic acids significantly reduced the astringency and bitterness of a grapefruit juice base, whilst enhancing the sweetness of the grapefruit juice base. Similarly, these data suggest that the green coffee extract comprising cyclohexanecarboxylic acids significantly reduced the astringency and enhanced the flavor intensity of a cranberry juice base. Additionally, these data suggest that the green coffee extract comprising cyclohexanecarboxylic acids enhanced the flavor intensity of a tomato juice base.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

The invention claimed is:

1. A method of enhancing a sweetness profile of a flavored article, the method comprising:
    providing a flavored article, wherein the flavored article comprises a steviol glycoside sweetener and citric acid; and
    adding at least one cyclohexanecarboxylic acid to the flavored article at a concentration ranging from 50 ppm to 200 ppm, based on the weight of the flavored article, wherein adding the at least one cyclohexanecarboxylic acid to the flavored article enhances a sweetness profile of the flavored article by enhancing a perceived sweetness intensity relative to a perceived lingering sweetness.

2. The method of claim 1, wherein the at least one cyclohexanecarboxylic acid is selected from the group consisting of:

- 5-caffeoylquinic acid (5-CQA), 3-caffeoylquinic acid (3-CQA), 4-caffeoylquinic acid (4-CQA),
- 3,4-dicaffeoylquinic acid (3,4-diCQA), 3,5-dicaffeoylquinic acid (3,5-diCQA), 4,5-dicaffeoylquinic acid (4,5-diCQA), 3-feruloylquinic acid (3-FQA), 4-feruloylquinic acid (4-FQA), 5-feruloylquinic acid (5-FQA), 3-p-coumaroylquinic acid (3-p-CoQA), 4-p-coumaroylquinic acid (4-p-CoQA),
- 5-p-coumaroylquinic acid (3-p-CoQA), 3,4-caffeoylferuloylquinic acid (3,4-CFQA),
- 3,4-feruloylcaffeoylquinic acid (3,4-FCQA), 3,5-caffeoylferuloylquinic acid (3,5-CFQA),
- 3,5-feruloylcaffeoylquinic acid (3,4-FCQA), 4,5-caffeoylferuloylquinic acid (4,5-CFQA),
    - 4,5-feruloylcaffeoylquinic acid (4,5-FCQA), and combinations thereof.

3. The method of claim 1, wherein the at least one cyclohexanecarboxylic acid is 5-caffeoylquinic acid.

4. The method of claim 1, wherein the adding step comprises adding at least one cyclohexanecarboxylic acid to the flavored article at a concentration ranging from 100 ppm to 200 ppm.

* * * * *